UNITED STATES PATENT OFFICE 2,500,315

ICE CREAM

Carl F. Koerver, Brooklyn, N. Y., assignor to The Borden Company, New York, N. Y., a corporation of New Jersey No Drawing. Application January 16, 1946,
Serial No. 641,638

6 Claims. (Cl. 99—136)

The present invention relates to the manufacture of ice cream. More particularly, it relates to the manufacture of an ice cream having markedly superior characteristics of flavor, body, texture and holding quality. Thus the present invention comprises not only an improvement in the process of making ice cream, but also provides an improved product.

Commercial ice creams usually contain certain percentages of butter fat, milk solids not fat which are usually supplied in the form of skim milk solids, sugar, stabilizing material and flavoring or flavoring and coloring material. The butter fat content of ice cream may vary anywhere from about 8 per cent up to 20 per cent or more by weight of the total ice cream, depending upon particular flavoring used and local regulations and further depending upon the grade and selling price of the ice cream. The present invention results in definite improvement in the flavor and body of the ice cream of any usual butter fat content and is particularly advantageous in high butter fat ice creams.

Many attempts have been made in the past to produce ice creams of improved food value, taste, and body by careful control of the ratio between butter fat and skim milk solids. It is generally recognized, however, that there are rather definite limitations on the amount of skim milk solids which may be added to an ice cream, such limitations residing in the tendency of certain of the constituents to impart a flavor which is likely to mask the pleasant flavor of the cream, and in the tendency of lactose to crystallize and as a result to impart a sandy texture to the ice cream.

Attempts have been made in the past to modify the skim milk solids with a view to overcoming the objections arising from the standpoint of taste and sandiness. One established practice with regard to sandiness is to reduce the relative amount of lactose in the skim milk solids by partially delactosing the same and thus to permit the addition of a slightly larger quantity thereof to an ice cream without danger of unpleasant crystallization. In other instances seed crystals of minute size are added to the ice cream in order that the lactose may crystallize in minute and thus relatively unobjectionable form.

I have discovered that ice cream may be improved in a very simple and effective manner which seems to be quite contrary to past procedures. It is my discovery that vastly improved ice cream may be produced by increasing the relative quantity of lactose with or without making a corresponding decrease in the relative quantities of the other milk solids not fat which occur as constituents of skim milk solids. In practicing my invention the total quantity of lactose should not rise above that which the art recognizes as the maximum beyond which undue crystallization occurs and of course in this respect the technique of seed crystallization may be found to be advantageous. However, in accordance with my invention, the quantity of lactose may be raised to substantially the maximum permissible quantity to secure new and unexpected improvements in the ice cream with regard to the flavor, texture and body thereof without the unfavorable results frequently flowing from an increase in the quantity of skim milk solids.

It is accordingly an object of the present invention to provide an ice cream of improved flavor, texture and body and to provide a process for the production of such improved ice cream. Other and further objects of the present invention will become apparent upon consideration of the following detailed disclosure of preferred embodiments of the invention.

The composition of skim milk solids has been examined by a number of workers in the art and the following table shows the results of three recognized authorities. In this table, the percentages are of course based on whole milk.

| According to— | Richmond | Tocher | Van Slyke |
|---|---|---|---|
| | Per Cent | Per Cent | Per Cent |
| Lactose | 4.70 | 4.64 | 5.10 |
| Proteins and other nitrogenous substances | 3.46 | 3.52 | 3.20 |
| Ash | .75 | .70 | .70 |
| Total | 8.19 | 8.86 | 9.00 |

From the above table it will be seen that according to Richmond, lactose comprises 52.70 per cent of the total milk solids not fat in skim milk solids. According to Tocher it comprises 52.40 per cent, and according to Van Slyke, it comprises 56.60 per cent. A figure of 53 per cent will be used in this specification. The ratio of lactose to the proteins and mineral salts in skim milk solids is therefore assumed to be 1.13:1.

The proteins, casein and lact albumen, have a definite flavor as do the mineral salts. Since ice cream should have the characteristic flavor of cream, it is obvious that any other ingredients which detract from the flavor of cream must be used in carefully controlled quantities. The lactose is a sugar and while it adds slightly to the sweetness of the ice cream, it does not detract in any way from the flavor thereof. It is generally recognized in the art that lactose will make the ice cream sandy if it is present in a quantity greater than about 5.8 to 6 per cent by weight of the total ice cream although the technique of seed crystallization may permit a slightly greater percentage. Thus if this limit is not to be exceeded, it will be recognized that not more than about 11 to 11½ per cent skim milk solids may be used in ice cream without incurring sandiness. While this establishes an upper limit on skim milk solids, it is a limit which is not too frequently reached because of the unpleasant flavor which may be imparted by the other components of skim milk solids.

I have discovered that while it might be considered desirable from the standpoint of flavor alone to reduce the relative quantity of skim milk solids, a definite disadvantage is suffered from the standpoint of texture and body. Surprising as it may seem, the texture and body of the ice cream suffers more from the reduction in lactose than it does from the reduction in protein.

I have found it preferable to increase the relative amount of lactose above that in which it would occur as a component of the skim milk solids which ordinarily would be incorporated in an established ice cream. This increase in the amount of lactose must not be carried beyond the safe limit with regard to sandiness but other than this, I find that relative increases in the quantity of lactose result in progressive improvements in texture, body and flavor of the resulting ice cream.

It is possible, particularly with high butter fat ice creams, to refrain from adding skim milk solids as such and to substitute therefor up to the maximum permissible amount of lactose. In this event, an exceedingly rich textured ice cream is produced in which the flavor of the cream is completely predominant. In this case, as in the case of all of the formulations in which the lactose content is increased as taught herein, the increase in percentage of soluble solids causes the ice cream to melt very rapidly upon being placed in the mouth. This releases the flavor freely and rapidly, giving a cooling and refreshing effect which frequently is missing in the rich and expensive grades of ice cream even though made in accordance with best practices prior to my invention. Similarly, in those ice creams in which the butter fat content is quite low and the skim milk solids content is correspondingly high, the insoluble components of the skim milk solids have detracted from the refreshment value of the ice cream. In such ice creams my invention is particularly desirable because the amount of insoluble solids will usually be decreased without decreasing and in most cases increasing the amount of soluble lactose. In any ice cream improved in accordance with my invention, the particular flavor of the fruits, syrups and the like which may be added to the ice cream is very sharply emphasized.

As suggested above, the amount of skim milk solids is ordinarily decreased as the butter fat content is increased. This is not only a matter of maintaining a fairly uniform total solids content but it has been demonstrated by experience that the undesirable flavor of certain constituents of the skim milk solids becomes more noticeable in the higher butter fat ice creams. Thus it is my belief that the following relationship between butter fat and skim milk solids has been accepted as more or less "ideal."

| Butter fat (Per cent of total ice cream) | Skim milk solids (Per cent of total ice cream) |
| --- | --- |
| Percent | Percent |
| 10 | 11.5 |
| 12 | 10 |
| 15 | 9 |
| 20 | 7 |

In none of the above relationships is the quantity of skim milk solids sufficient to endanger the ice cream from the standpoint of sandiness. In each case, however, any substantial increase in skim milk solids would very likely produce an undesirable flavor. In a 16 per cent butter fat ice cream, for example, as much as 10 per cent skim milk solids results in an ice cream having such a pronounced flavor imparted thereto that it detracts from the expected pleasing flavor of cream.

I have discovered that remarkably apparent improvement may be made even in these "ideal" formulations by reducing the relative quantities of all milk solids not fat other than lactose. This reduction may be made most simply by reducing the quantity of milk solids not fat, usually supplied as skim milk solids and supplying additional lactose. The quantity of added lactose may be sufficient merely to bring the total lactose content back approximately to the amount which would have been present had the quantity of skim milk solids not been reduced, or it may be greater so long as the total lactose content does not rise above the 5.8 to 6 per cent limit or the slight extension thereof afforded by seed crystallization. The lactose thus added may be either alpha, beta or crude lactose. The same results may be achieved by treating skim milk solids to reduce the relative quantity therein of proteins and mineral salts and using such lactose-rich material in the place of part or all of the skim milk solids.

My invention may be practiced by separating skim milk solids and adding the individual components or groups thereof as may be desired. In accordance with the teaching of the following examples the relative quantity of lactose should always be greater than that which would be contained in an equivalent quantity of skim milk solids. Thus I have found it to be particularly advantageous to base an ice cream upon predetermined quantities of buter fat, protein, lactose, mineral salts and sugar rather than to follow the old practice of basing ice cream on predetermined quantities of butter fat, skim milk solids and sugar.

As a preliminary example, an ice cream normally containing 9 per cent skim milk solids may be changed to include 7 per cent skim milk solids plus 2 per cent lactose. If we assume that lactose comprises 53 per cent of the skim milk solids, it will be seen that of the 9 per cent skim milk solids 4.77 per cent is lactose. Of the 7 per cent skim milk solids 3.71 per cent is lactose. To the latter figure we add another 2 per cent of lactose to bring the total lactose of the improved ice cream to 5.71 per cent. This means that the improvement results in increasing the lactose content of the ice cream by 0.94 per cent of the total weight of the ice cream and reducing the proteins and mineral salts as a group by an equal amount. Expressed otherwise, the ratio of lactose to all of the other milk solids not fat in the improved ice cream is 1.73:1. This ratio is greater by 53% than the corresponding ratio in skim milk solids.

If the improvement described in this preliminary example is made in an ice cream containing 15 per cent butter fat and 16 per cent sugar as major constituents, the resulting ice cream when compared to ice cream made in the same manner from the original formulation will have greatly superior characteristics of flavor, body and texture. In addition, the ice cream improved in accordance with my invention will stand up a great deal better in storage, this quality being especially apparent when the ice cream is stored in the ice cube compartment of an ordinary domestic refrigerator. Another very noticeable improvement lies in the fact that when my improved ice cream is served in a dish, it will melt in a particularly appetizing manner. There is no tendency toward the formation of a sleek, greasy appearing film over the entire surface of the serving of ice cream. Neither is there any tendency in my improved ice cream to melt without changing shape, a peculiar phenomenon in certain ice creams which leads to the suspicion that the product may be adulterated.

In the disclosure thus far made, the effect upon specific formulations as a result of the use of various flavoring materials has not been discussed. In the manufacture of many flavors of ice cream the quantity of flavoring material used is so small as not to have any substantial effect upon the relationship between butter fat and skim milk solids or upon the relationship between butter fat and the maximum amount of lactose that may be used without sandiness. However, in the case of ice creams containing fruit, as for example strawberry ice cream, the quantity of fruit in the finished ice cream may constitute a substantial portion of the total weight. Strawberry ice cream may contain about 30 per cent fruit, the remaining 70 per cent comprising "ice cream mix." If this ice cream mix contained 16 per cent butter fat (based on the weight of the mix) and 9 per cent skim milk solids it would, of course, be possible to substitute 7 per cent skim milk solids and 2 per cent lactose in accordance with the disclosure above. However, since the limitation with regard to maximum lactose content is based upon the finished ice cream, and not upon the ice cream mix, it is possible to make a much more extensive addition of lactose and to produce a strawberry ice cream of unusual excellence.

Thus it is possible, without danger of producing sandiness, to add lactose in such a quantity as to bring the total content in the finished ice cream up to about 6 per cent. To this end, therefore, the ice cream mix intended for use in strawberry ice cream may contain 16 per cent butter fat, 7 per cent skim milk solids (of which 53 per cent, or 3.71 per cent of the total of the mix, may be assumed to be lactose). Lactose may be added, for example, in an amount representing 4 per cent of the weight of the mix, bringing the total lactose content up to 7.71 per cent. Since the ice cream mix constitutes only 70 per cent of the finished strawberry ice cream, the lactose content of the finished product will be about 5.4 per cent, well within the established limit.

The remaining examples will be set forth without reference to the effect of voluminous flavoring materials and it will be understood that in each instance such effect may be taken into account in accordance with the principles applied above in the example pertaining to strawberry ice cream.

Example 1.—An ice cream established on the formula, butter fat 12 per cent, skim milk solids 10 per cent, sugar 16 per cent, stabilizer 0.25 per cent, may be improved in accordance with my invention by substituting for the 10 per cent skim milk solids the following:

| Skim milk solids | Lactose | Ratio, lactose to proteins and mineral salts |
|---|---|---|
| Per cent | Per cent | |
| 9 | 0.75 | 1.30:1 |
| 8 | 1.25 | 1.46:1 |
| 7 | 1.75 | 1.66:1 |

Example 2.—An ice cream established on the formula, butter fat 15 per cent, skim milk solids 9 per cent, sugar 16 per cent, stabilizer 0.25 per cent, may be improved in accordance with my invention by substituting for the 9 per cent skim milk solids, the following:

| Skim milk solids | Lactose | Ratio, lactose to proteins and mineral salts |
|---|---|---|
| Per cent | Per cent | |
| 8 | 1.0 | 1.39:1 |
| 7 | 2.0 | 1.73:1 |
| 6 | 2.5 | 2.01:1 |

Example 3.—An ice cream established on the formula, butter fat 20 per cent, skim milk solids 7 per cent, sugar 16 per cent, stabilizer 0.2 per cent, may be improved in accordance with my invention by substituting for the 7 per cent skim milk solids, the following:

| Skim milk solids | Lactose | Ratio, lactose to proteins and mineral salts |
|---|---|---|
| Per cent | Per cent | |
| 6.5 | 0.5 | 1.3:1 |
| 6.0 | 1.0 | 1.51:1 |
| 5.0 | 2.0 | 1.98:1 |
| 3.0 | 2.5 | 2.9:1 |
| 1.25 | 4.5 | 8.75:1 |

The butter fat is usually supplied in the form of cream and of course the cream will contain some skim milk solids. It will be understood that this is included in the examples set forth above. The last variation of Example 3 is illustrative of an ice cream based on cream with no added skim milk solids.

In each of the above examples the change in formulation may be accomplished by using skim milk solids and lactose selected from the group comprising alpha, beta and crude lactose, or it may be accomplished by treating skim milk solids to reduce the relative quantity therein of all components other than lactose and using such lactose-rich product to establish the new formulation. Similarly, the changes in formulation may be accomplished by separate addition of proteins, mineral salts and lactose.

From a consideration of the above examples it will become apparent that the total solids content of the ice cream is but little affected. In many instances the total solids is not changed at all and in the remaining instances the change is at most about 1.5 per cent. This is of practical importance when it is recalled that skim milk solids are frequently added for the purpose of bringing the total solids up to accepted standard. Thus it is only with high butter fat ice creams that it is possible to substitute lactose for the entire skim milk solids content without objectionable reduction in total solids. Except for this practical consideration, it should be pointed out that percentages set forth in the above examples need not be precisely followed. It is entirely possible, for example, to substitute for 7 per cent skim milk solids, 6 per cent skim milk solids and 1.5 per cent lactose. It will be recognized by those skilled in the art that such variations may be availed of to establish a desired "coldness" and that particular flavors of ice cream may be controlled in this regard in a manner heretofore unavailable in the art.

From a further consideration of the above examples it will be observed that the ratio of lactose to proteins and mineral salts in my improved ice creams is at the lowest 1.3:1. Such ratio is greater than the average ratio assumed above of lactose to proteins and mineral salts in skim milk solids by slightly more than 10 per cent of the last-mentioned ratio. Obviously, also, in my improved ice cream the ratios of lactose to the mineral salts or to any other component or group of components of skim milk solids is greater by at least 10 per cent than the corresponding ratios in skim milk solids.

As pointed out above, there is a commercial practice of partially delactosing skim milk solids. If for any reason it is desired to use a partially delactosed product and at the same time to secure the benefits of my invention, it will be necessary to increase the amount of additional lactose to make up for the delactosing operation.

It is well known that lactose is much less sweet than surcose or other sugars ordinarily used in ice cream, and for this reason it will be apparent that in many of the examples cited herein there will be no need for making any reduction in the quantity of ordinary sugar used. In some cases, however, a slight reduction can be made and in other cases, particularly where a delicate flavoring is used, it may be necessary to reduce the amount of ordinary sugar to avoid excessive sweetness.

The present invention brings about an unusually great improvement when it is used in connection with high butter fat ice creams of delicate flavor. The increase in "coldness" plus the reduction in quantity of materials likely to mask the flavor of cream both contribute to this result. For similar reasons my invention results in decided improvement in the lower butter fat ice creams but it should be pointed out that it does not offer any opportunity to increase bulk at the expense of butter fat. One particular advantage of my invention is that "slickness" which sometimes gives trouble in high butter fat ice creams may be entirely overcome.

Slight differences in flavor of ice cream are very difficult to detect, partly because it is a cold product and the amount of flavoring must be exaggerated, and partly because the flavor may be sharply affected by changes in freezing technique, overrun and the like. However, I have found that in most instances an improvement in flavor as well as in body and texture is clearly detectable when I increase the amount of lactose by 0.5 per cent of the total weight of the ice cream above the amount which was contained in the skim milk solids formerly used in a given formulation. Expressed otherwise, the improvement is clearly detectable if the ratio of lactose to the other components of skim milk solids in the improved ice cream is greater than the ratio of lactose to said other components in skim milk solids by at least 10 per cent of said last-mentioned ratio.

In general, I prefer to increase the amount of lactose to a quantity which will not seem to make a particular flavor and type of ice cream too cold and which will still be below the limit established by the tendency of lactose to produce a sandy texture.

It is to be understood that it is intended to cover all changes and modifications of the examples of the invention herein chosen for the purpose of illustration which do not constitute departures from the spirit and scope of the invention.

I claim:

1. As an article of manufacture ice cream containing in addition to the usual sweetening, flavoring and stabilizing materials: butter fat, skim milk solids, and lactose additional to that contained in said skim milk solids, the quantity of lactose in the finished ice cream bearing a ratio to the quantity of mineral salts present as milk solids therein greater by at least 10% than the ratio of lactose to mineral salts in skim milk solids.

2. As an article of manufacture ice cream containing in addition to the usual sweetening, flavoring and stabilizing materials: butter fat, skim milk solids, and lactose additional to that contained in said skim milk solids, said lactose being selected from the group consisting of alpha, beta and crude lactoses, the quantity of lactose in the finished ice cream bearing a ratio to the quantity of mineral salts present as milk solids therein greater by at least 10% than the ratio of lactose to mineral salts in skim milk solids.

3. As an article of manufacture ice cream containing in addition to the usual sweetening, flavoring and stabilizing materials: butter fat, skim milk solids, and lactose additional to that contained in said skim milk solids, the quantity of lactose in the finished ice cream bearing a ratio to the quantity of mineral salts present as milk solids therein greater by at least 10% than the ratio of lactose to mineral salts in skim milk solids and being such that the total lactose in said ice cream shall not exceed approximately 6% by weight of the finished ice cream.

4. As an article of manufacture ice cream containing in addition to the usual sweetening, flavoring and stabilizing materials: butter fat, skim milk solids, and lactose additional to that contained in said skim milk solids, said lactose being selected from the group consisting of alpha, beta and crude lactoses, the quantity of lactose in the finished ice cream bearing a ratio to the quantity of mineral salts present as milk solids therein greater by at least 10% than the ratio of lactose to mineral salts in skim milk solids and being such that the total lactose in said ice cream shall not exceed approximately 6% by weight of the finished ice cream.

5. In a method of producing ice cream including as principal ingredients butter fat, skim milk solids, sugar and flavoring material, the improvement which comprises adding as an ingredient of said ice cream lactose selected from the group consisting of alpha, beta and crude lactoses, the quantity of lactose thus added being in addition to the lactose contained in said skim milk solids and being such that the quantity of lactose in the finished ice cream bears a ratio to the quantity of mineral salts present as milk solids therein greater by at least 10% than the ratio of lactose to mineral salts in skim milk solids.

6. In a method of producing ice cream including as principal ingredients butter fat, skim milk solids, sugar and flavoring material, the improvement which comprises adding as an ingredient of said ice cream lactose selected from the group consisting of alpha, beta and crude lactoses, the quantity of lactose thus added being in addition to the lactose contained in said skim milk solids and being such that the quantity of lactose in the finished ice cream bears a ratio to the quantity of mineral salts present as milk solids therein greater by at least 10% than the ratio of lactose to mineral salts in skim milk solids and the lactose content of said finished ice cream is not greater than about 6% by weight of said finished ice cream.

CARL F. KOERVER.

REFERENCES CITED

The following references are of record in the file of this patent:

UNITED STATES PATENTS

| Number | Name | Date |
|---|---|---|
| 2,193,950 | Turnbow | Mar. 19, 1940 |
| 2,282,800 | Musher | May 12, 1942 |
| 2,233,178 | Otting | Feb. 25, 1941 |
| 2,307,234 | Otting | Jan. 5, 1943 |
| 2,433,850 | Leviton | Jan. 6, 1948 |

OTHER REFERENCES

"The Manufacture of Low-Lactose Skim Milk for Use in Ice Cream," reprinted from Journal of Dairy Science, February 1934, vol. XVII, No. 2, pages 103–114.